TELETYPEWRITER MESSAGE DISTRIBUTING SYSTEM

Filed March 28, 1961 5 Sheets-Sheet 1

INVENTORS P. G. CAMERON
J. L. MAXWELL
BY R C Lipton
ATTORNEY

INVENTORS P. G. CAMERON
J. L. MAXWELL
BY R. C. Lipton
ATTORNEY

Feb. 19, 1963 P. G. CAMERON ET AL 3,078,336

TELETYPEWRITER MESSAGE DISTRIBUTING SYSTEM

Filed March 28, 1961 5 Sheets-Sheet 3

INVENTORS P. G. CAMERON
J. L. MAXWELL

BY R C Lipton

ATTORNEY

INVENTORS P. G. CAMERON
J. L. MAXWELL
BY R C Lipton
ATTORNEY

INVENTORS P. G. CAMERON
J. L. MAXWELL
BY R C Lipton
ATTORNEY

United States Patent Office 3,078,336

Patented Feb. 19, 1963

3,078,336
TELETYPEWRITER MESSAGE DISTRIBUTING SYSTEM

Phillip G. Cameron, Walnut Creek, and John L. Maxwell, Redwood City, Calif., assignors to American Telephone and Telegraph Company, New York, N.Y., a corporation of New York Filed Mar. 28, 1961, Ser. No. 98,824
11 Claims. (Cl. 178—3)

This invention relates to a telegraph distribution system and more particularly to a system for collecting messages from station transmitters on single and multistation lines and routing the messages over a plurality of outgoing trunk lines.

It is a broad object of this invention to provide an improved system for selecting remote stations on single and multistation lines one at a time and in rotation.

Another broad object of this invention is to provide an improved system for selectively extending trunk lines to station lines.

In certain systems of the type wherein messages are collected from a plurality of single and multistation lines for transmission to a central station or switching office, for example, over one or more trunks, a transmitter-start circuit is provided for each of the incoming lines to select the remote transmitter one at a time and in rotation. In addition, since the outgoing trunks are fewer in number than the station lines, intermediate message storage units are required to store incoming messages in the event that all the trunks are busy.

Another object of this invention is to provide a transmitter-start circuit which is common to a plurality of single and multistation lines.

A further object of this invention is to provide a transmitter-start circuit which is seizable or controllable by any one of a plurality of outgoing trunk lines.

An additional object of this invention is to eliminate intermediate storage of messages in a telegraph distribution system.

In accordance with a specific embodiment of the present invention, a sequence circuit, together with a code generator, provides start-code signals for selectively starting outlying station message transmitters on a plurality of single and multistation lines, one at a time and in rotation, in the event that one of the outgoing trunks is idle. The sequence circuit also designates the station line extending to the selected station transmitter in a register associated with the idle trunk. A link circuit thereupon proceeds to selectively connect the idle trunk to the station line in accordance with the registered designation and a connector circuit connects the output of the code generator to the station line by way of the idle trunk circuit whereby the start-code signal is impressed on the line extending to the selected station transmitter. If the selected transmitter fails to respond, the sequence circuit provides the start-code signal for the next successive station and designates the associated station line in the idle trunk register whereby the sequence is repeated. In the event, however, that the selected transmitter is started, the trunk is rendered busy, the sequence circuit retires until the next trunk becomes idle and the registered designation is maintained to preclude the designation of the line by other registers. The termination of the message restores the trunk to the idle condition and removes the maintained registration.

The means for fulfilling the foregoing objects and the practical embodiment of the features of this invention will be fully understood from the following description taken in conjunction with the accompanying drawings wherein:

FIG. 1 illustrates in block form the manner in which the various circuits and equipments are arranged to form a typical distributing system in accordance with the invention; and FIGS. 2 through 5, when arranged as shown in FIG. 6, show the details of circuits and equipments which cooperate to form the distributing system.

In the drawing, the relay contacts are shown detached from the relay windings. The relay winding is given a letter designation preceded by a number indicating the figure number of the drawing on which the relay winding is located. Contacts associated with the relay winding are given the same number and letter designations. Contacts which are closed when the relay is de-energized, known as "break contacts," are represented by a single short line perpendicular to the conductor line, while contacts which are closed when the relay is energized, known as "make contacts," are represented by two short, crossed lines diagonally intercepting the conductor line.

Referring now to FIG. 1, a plurality of single and multistation lines 101 through 105 are shown extending from link circuit 108 at a central distributing office, sometimes called a telegraph concentrator. Line 101 is a multistation line and extends to station A1, station B1 and station C1 in series. Similarly, multistation line 102 extends to station A2 and station B2 in series, multistation line 103 extends to station E3 and station F3 in series, and multistation line 104 extends to station C4 and station D4 in series. Line 105 is a single station line which extends to station G5 generally indicated by block 111.

Station 111 which may be considered typical of the outlying stations includes tape transmitter 112, sequential selector 113, and transmitter-start circuit 114. Sequential circuit 113 monitors signals applied to line 105 and applies control pulses to transmitter-start circuit 114 in response to the application of predetermined signals on line 105. A sequential selector mechanism suitable for use in this system is disclosed in Patent 2,568,264 granted to W. J. Zenner on September 18, 1951. The disclosure of this patent is hereby incorporated herein by reference as though fully set forth herein.

In order to transmit a message from transmitter 112, a message tape containing address characters, the message text and an end-of-message signal is inserted in transmitter 112. When a predetermined start signal is received from line 105, sequential selector 113 instructs transmitter-start circuit 114 to start transmitter 112. In the event that the message tape has been inserted in transmitter 112, the transmitter is started and the message is applied to line 105. At the conclusion of the message, sequential selector 113 responds to the end-of-message signal by instructing transmitter-start circuit 114 to stop transmitter 112.

Trunk circuit 106 and trunk circuit 107 also extend from link circuit 108. Trunk circuits 106 and 107 are connected to outgoing trunk A and outgoing trunk B, respectively, and the outgoing trunks in turn may extend, for example, to a central switching office. Sequential selector 124 and sequential selector 126, which are substantially identical to the sequential selectors at the outlying stations, monitor the signals applied to trunk circuit 106 and trunk circuit 107, respectively.

Assuming trunk circuit 106 is idle and no message is being transmitted to trunk A, sequence circuit 120 proceeds to code the start signal for one of the outlying stations, such as station A1, on generator 121. With trunk circuit 106 idle, sequence circuit 120 also registers an indication in register 122 corresponding to line 101 which extends to station A1. Register 122 in turn effects the connection of line 101 to trunk circuit 106 by way of link circuit 108. In addition, register 122 instructs connector 123 to connect the output of generator 121 to line 101 by way of trunk circuit 106 and link circuit 108. With the start signal for station A1 coded on generator 121 and generator 121 connected to trunk circuit 106, the start signal is applied to line 101 whereby the transmitter at station A1 is started in the event that it is supplied with the message tape.

Assuming that the transmitter at station A1 is not supplied with a message tape, no response is received by trunk circuit 106 and sequence circuit 120 proceeds to code the start signal for the next successive station, such as station A2, on generator 121 and register an indication corresponding to line 102 in register 122. Accordingly, trunk circuit 106 is extended to line 102 and the start signal generated by generator 121 is transmitted to station A2 by way of line 102. In this manner each of the outlying stations is polled for message material by trunk circuit 106 one at a time and in rotation.

In the event that the transmitter at station A1 is started, the message impressed on line 101 is applied to trunk A by way of link circuit 108 and trunk circuit 106. In response to the initial character of the message, sequential selector 124 locks the registration indicating line 101 in register 122 whereby the link connection from line 101 to trunk circuit 106 is maintained. In addition, register 122 informs register 125, which is associated with trunk circuit 107, that line 101 is busy, precluding the registration of an indication corresponding to line 101 in register 125. Register 122 also instructs sequence circuit 120 to register subsequent indications in register 125.

The next subsequent start signal coded by sequence circuit 120 on generator 121 polls station E3 on line 103. In addition, sequence circuit 120 registers an indication corresponding to line 103 in register 125 and register 125 in turn extends line 103 to trunk circuit 107 by way of link circuit 108. In addition, register 125 instructs connector 123 to connect the output of generator 121 to trunk circuit 107. Accordingly, with trunk circuit 106 busy, trunk circuit 107 proceeds to poll the outlying stations for message material, skipping the stations on line 101.

In the event that trunk circuit 107 starts an outlying station, sequential selector 126 responds to the initial character of the message by maintaining the registered indication in register 125. With the registrations maintained in both register 122 and register 125, the operaiton of sequence circuit 120 is terminated until an end-of-message signal is received.

When sequential selector 124 detects an end-of-message signal, the registered indication in register 122 is removed. Register 122 in turn instructs link circuit 108 to disconnect line 101 from trunk circuit 106. In addition, register 122 restarts sequence circuit 120 whereby trunk circuit 106 again polls the outlying stations. Similarly, the detection of an end-of-message signal by sequential selector 126 removes the registration in register 125 whereby trunk circuit 107 is disconnected from the incoming line.

In the event that a message transmission terminates without the end-of-message signal, sequential selector 124, for example, raises an alarm in alarm circuit 129 by way of coder 128. Upon the operation of an appropriate key in key panel 130 by the station attendant, coder 128 codes the end-of-message signal on generator 121. In addition, sequential selector 124 together with register 122 instructs connector 123 to reconnect the output of generator 121 to trunk circuit 106 and the end-of-message signal is applied to trunk circuit 106 and to line 101 by way of link circuit 108. The impression of the end-of-message signal on trunk circuit 106 and line 101 restores station A1 to the initial condition and removes the registration in register 122 whereby line 101 is disconnected from trunk circuit 106 and trunk circuit 106 may proceed to again poll the outlying stations.

*Detailed Description*

Figure 1:
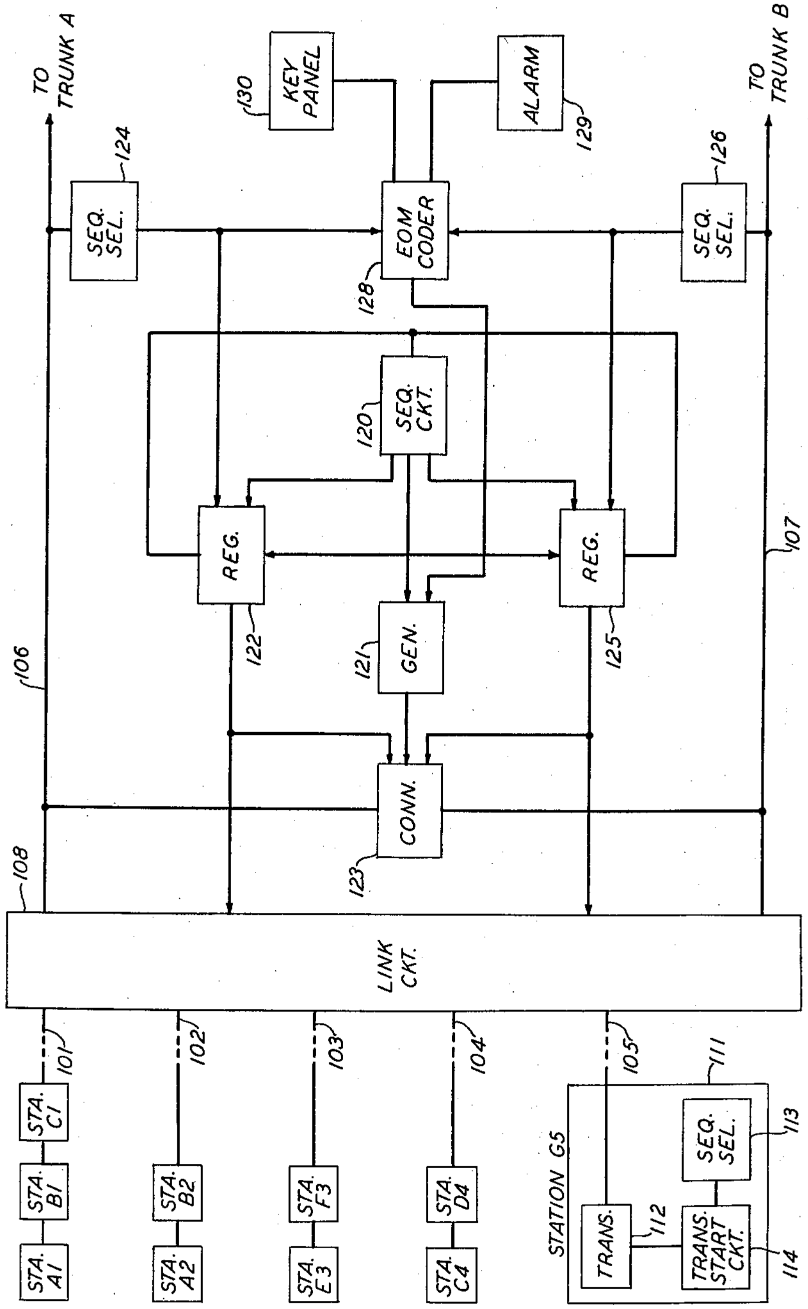
Figure 6:
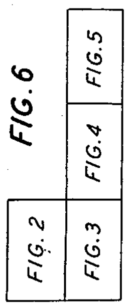
Figure 2:
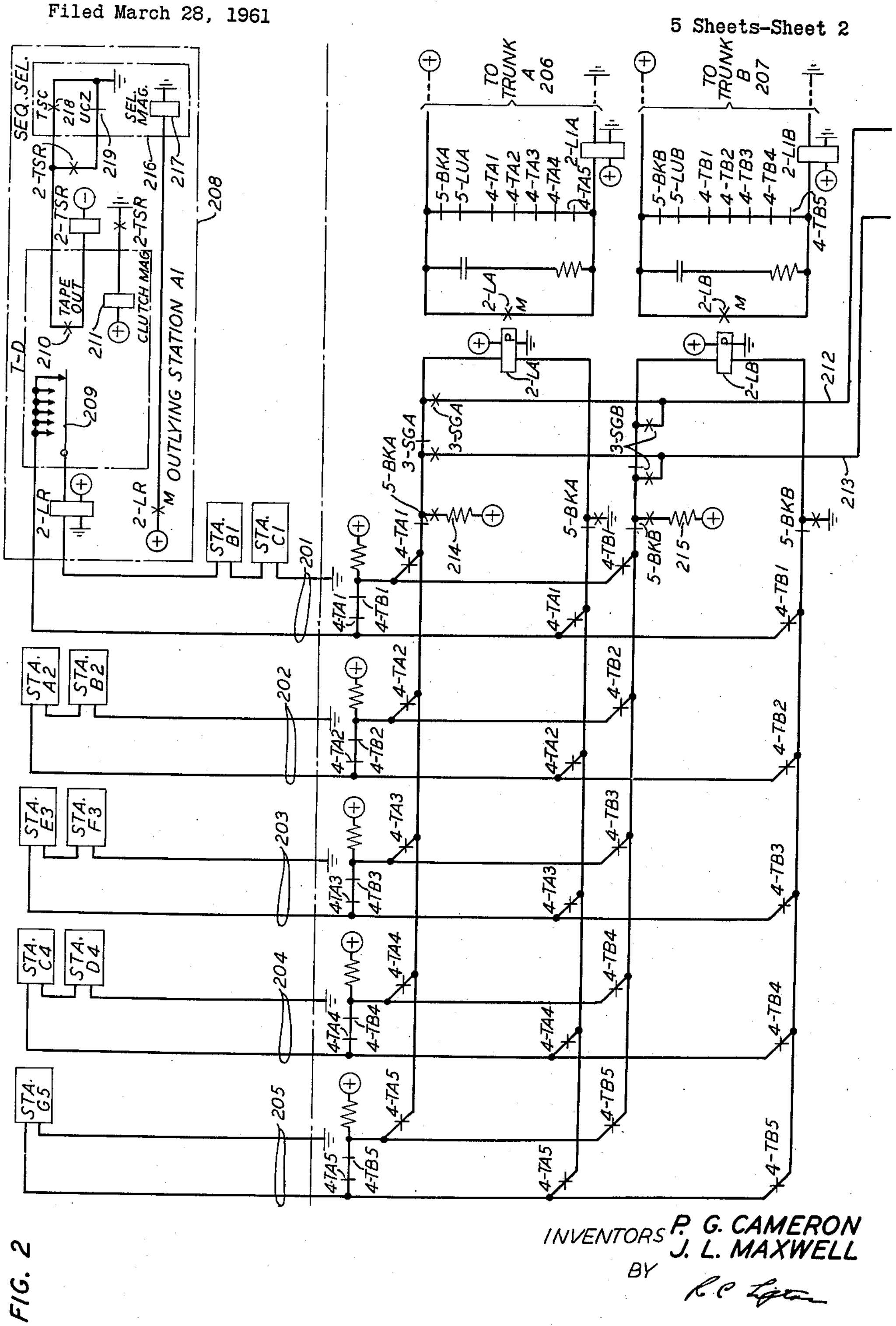

Referring now to FIGS. 2 through 5 and more particularly to FIG. 2, a first trunk circuit A, designated by metallic pair 206, and a second trunk circuit B, designated by metallic pair 207, are shown extending from the telegraph concentrator. Trunks 206 and 207 may, for example, extend to a telegraph switching office. In addition, half-duplex telegraph transmission channels 201 through 205 are shown extending from the telegraph concentrator. The half-duplex channels are also shown as metallic transmission pairs. It is to be understood, however, that each of the half-duplex lines may comprise any of the usual types of telegraph transmission channels suitable for the transmission of telegraph signals in either direction.

*Outlying Stations*

Half-duplex line 201 extends to station A1 generally indicated by block 208, station B1 and station C1. Similarly, each of the other half-duplex lines extend to outlying stations designated by the letters A through G.

Outlying station 208 which may be considered typical of the above-mentioned outlying stations includes a transmitter-distributor 209, a sequential selector 216 and line relay 2–LR. The application of signals to line 201 by way of the primary winding of relay 2–LR and the stop contact of transmitter-distributor 209 operates the marking contact of relay 2–LR to apply the line signals to select magnet 217 of sequential selector 216.

In response to the end-of-message character sequence, figures V–Z impressed on line 201, sequential selector 216 is placed in the "select" condition and momentarily opens normally closed contacts 219. While in the "select" condition the impression of the character A, for example, momentarily closes contacts 218. The impression of the end-of-address character sequence to select magnet 217 restores sequential selector 212 to the "nonselect" condition.

In the event that tape is placed in transmitter-distributor 209, tape-out contacts 210 close whereby the momentary closure of contacts 218 completes a path from ground by way of contacts 218 and 210 and the winding of relay 2–TSR to battery, operating relay 2–TSR which locks by way of contacts 210, make contacts 2–TSR and contacts 219 to ground. Relay 2–TSR operated, completes an obvious energizing path for clutch magnet 211 of transmitter-distributor 209. Accordingly, the impression of the character A on line 201 starts transmitter-distributor 209 in the event that it is supplied with tape.

The tape supplied to transmitter-distributor 209 includes a message which is preferably preceded by letters characters, the address characters of the called stations and an end-of-address signal. The message text follows the end-of-address signal and is concluded by the end-of-message sequence figures V–Z.

Since relay 2–LR follows the signals applied to line 201 by transmitter-distributor 209, the impression of the end-of-message signal is applied to select magnet 217 whereby sequential selector 216 is placed in the "select" condition and contacts 219 momentarily open to release relay 2–TSR. The release of relay 2–TSR opens the previously-described energizing path for clutch magnet 211 whereby transmitter-distributor 209 is stopped upon the transmission of the end-of-message signal. Similarly, the impression of the character B on line 201 starts the transmitter-distributor of station B1 and the impression of the character C on line 201 starts the transmitter-distributor of the station C1 in the same manner. In a similar manner the impression of the character A on line 202 starts the transmitter-distributor of station 2A, the impression of the character E on line 203 starts the transmitter-distributor of station E3, the impression of the character C on line 204 starts the transmitter-distributor of station C4, the impression of the character G on line 205 starts the transmitter-distributor of station G5, etc.

*Sequence Circuit*

Figure 4:
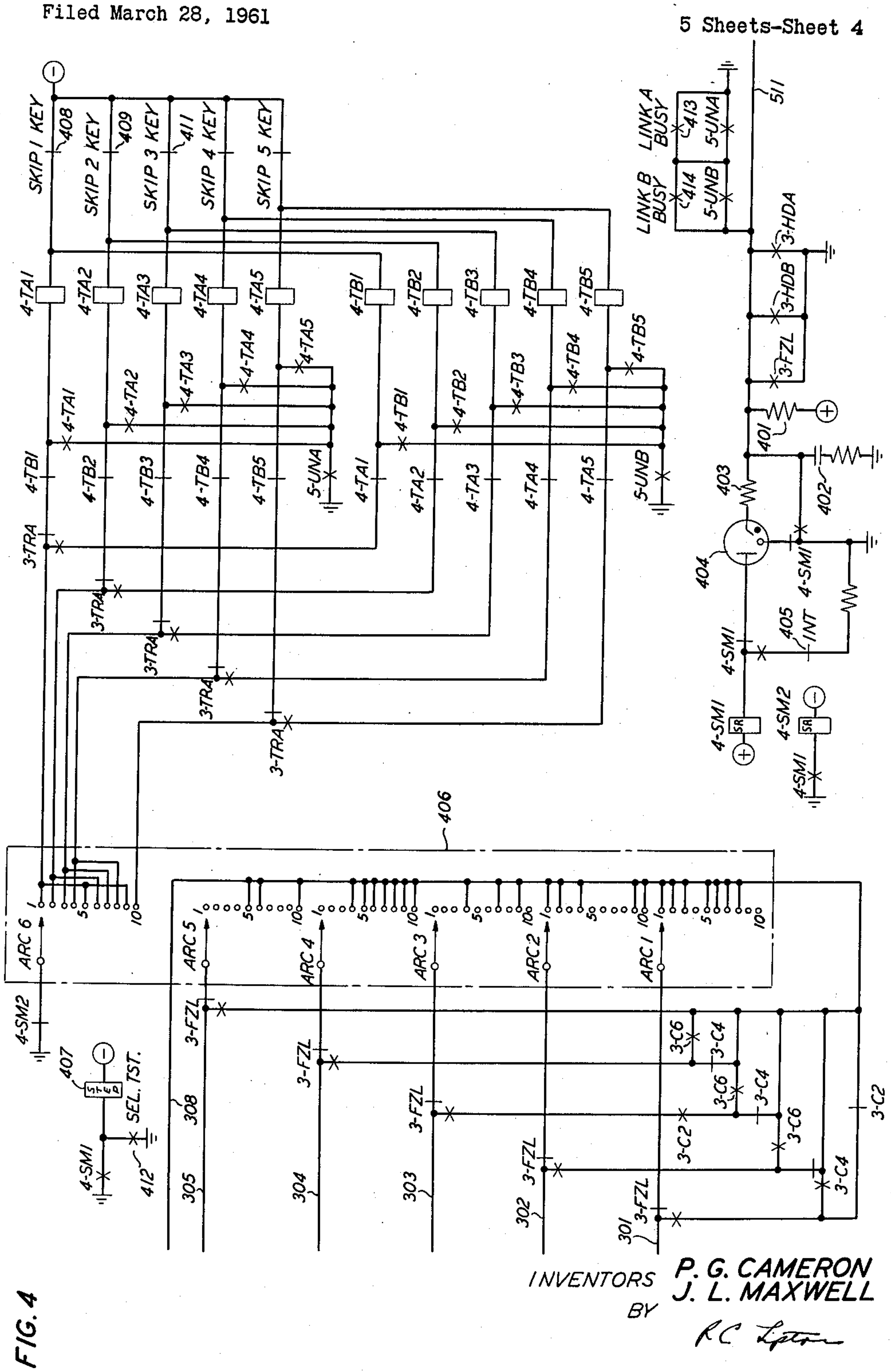

In the initial condition of the telegraph concentrator the upper plate of capacitor 402, FIG. 4, is charged by way of resistor 401 which extends to positive battery. This positive charge is extended to the control electrode of gas tube 404 by way of resistor 403. After approximately one second, the positive potential applied to the control electrode of tube 404 is raised sufficiently to fire the tube whereby current is drawn from positive battery by way of the winding of slow-to-release relay 4–SM1, the break contacts of contacts 4–SM1, the plate-to-cathode path of tube 404 and the break contacts of contacts 4–SM1 to ground, operating relay 4–SM1 which locks by way of the make contacts of contacts 4–SM1 and the normally closed interrupter contacts 405 of stepping switch 406 to ground. Relay 4–SM1 operated, opens the previously-described current path for tube 404 and discharges capacitor 402 to ground by way of the make contacts of contacts 4–SM1. In addition, relay 4–SM1 operated, completes an obvious operating path for slow-to-release relay 4–SM2 and completes an obvious energizing path for step magnet 407 of stepping switch 406.

The energization of step magnet 407 opens interrupter contacts 405 whereby the locking path of relay 4–SM1 is opened. When relay 4–SM1 releases, the operating path of relay 4–SM2 is opened and step magnet 407 is deenergized whereby the wipers of arcs 1 through 5 of stepping switch 406 advance one position to position 1, for example, as shown in FIG. 4.

*Polling the Outlying Stations*

When relay 4–SM2 releases, a path is completed from ground by way of break contacts 4–SM2, the wiper and position 1 of arc 6 of stepping switch 406, the break contacts of contacts 3–TRA, break contacts 4–TB1, the winding of relay 4–TA1 and the normally closed contacts of skip 1 key 408 to battery, operating relay 4–TA1.

Relay 4–TA1 operated, opens a short across duplex line 201 by way of break contacts 4–TA1 and 4–TB1. In addition, relay 4–TA1 operated, extends line 201 through the primary winding of relay 2–LA by way of make contacts 4–TA1, the break contacts of contacts 5–BKA, the break contacts of contacts 3–SGA, the primary winding of relay 2–LA, the break contacts of contacts 5–BKA and make contacts 4–TA1 whereby the normally opened marking contacts of relay 2–LA are closed to short trunk 206. Trunk 206, however, is normally shorted by break contacts 5–BKA, 5–LUA and 4–TA1 through 4–TA5 maintaining trunk 206 in the marking condition. The operation of relay 4–TA1 thus removes the short across trunk 206 whereby the signals applied to relay 2–LA are repeated to trunk 206 via marking contacts 2–LA. Since trunk circuit 206 extends by way of the primary winding of relay 2–L1A, it is noted that the signals applied to trunk 206 are repeated by relay 2–L1A.

Figure 5:
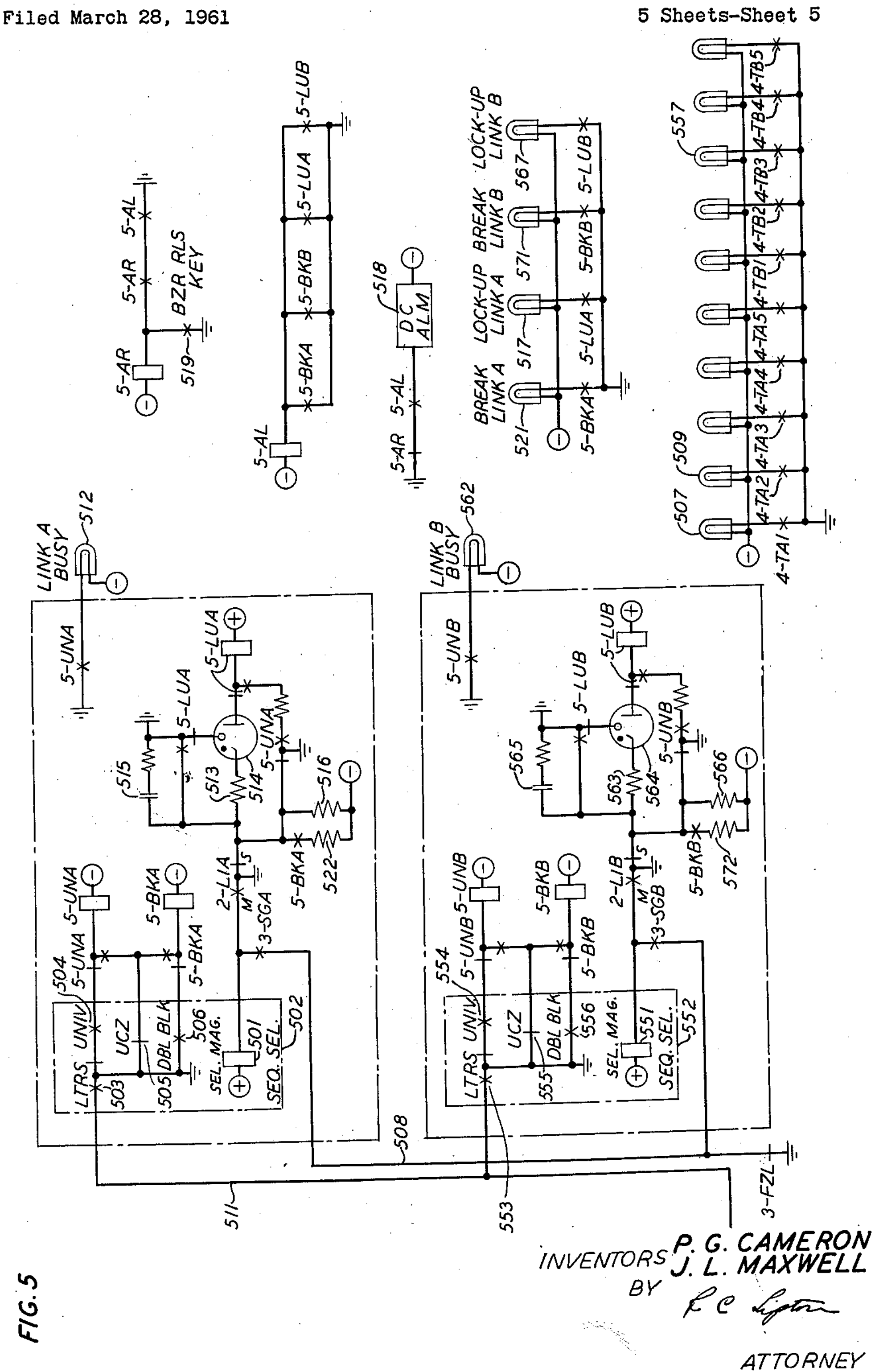

Relay 4–TA1 operated also completes an obvious energizing path for lamp 507, FIG. 5, indicating that line 201 has been extended to trunk circuit 206. Relay 4–TA1 operated also completes a path from battery by way of the winding of relay 3–SGA, FIG. 3, the break contacts of contacts 3–FZL, make contacts 4–TA1, the break contacts of contacts 3–TRA and break contacts 4–SM2, 4–SM1 and 3–AX1 to ground, operating relay 3–SGA which locks by way of the break contacts of contacts 3–FZL, make contacts 3–SGA and break contacts 3–AX2. Relay 3–SGA operated, extends ground to select magnet 501 of sequential selector 502, FIG. 5, by way of make contacts 3–SGA, lead 508 and break contacts 3–FZL. It is noted that the winding of select magnet 501 also extends to the marking contacts of relay 2–L1A whereby select magnet 501 normally follows signals applied to trunk 206. Accordingly, the operation of relay 3–SGA blinds select magnet 501 to the signals applied to trunk 206.

Sequential selector 502, in response to the end-of-message code sequence figures V–Z, is placed in the "select" condition and momentarily opens contacts 505. While in the "select" condition, the application of the character letters to select magnet 501 momentarily closes the make contacts of contacts 503 and momentarily opens the break contacts of contacts 503. In addition, contacts 504 momentarily close upon the application of each character to select magnet 501. Sequential selector 502 is restored to the "nonselect" condition in response to the application of the end-of-address sequence to select magnet 501. In addition, the impression of two successive blank characters to select magnet 501 momentarily closes contacts 506.

Figure 3:
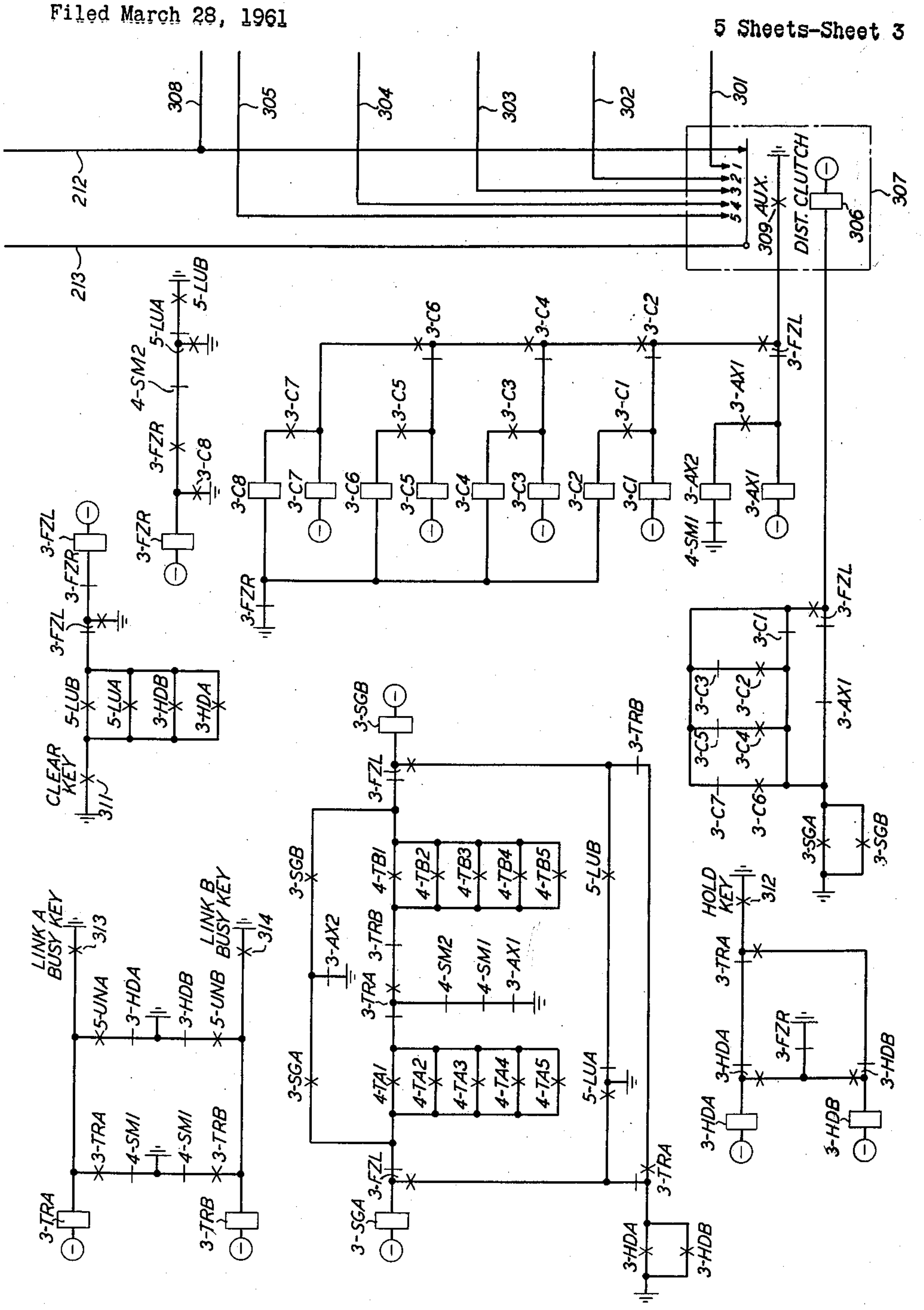

Returning now to relay 3–SGA operated, line 201 is extended from battery by way of make contacts 4–TA1, the break contacts of contacts 5–BKA, the make contacts of contacts 3–SGA, lead 213, the wiper or common lead and the stop contact of distributor 307, FIG. 3, lead 212, make contacts 3–SGA, FIG. 2, to the primary winding of relay 2–LA. Accordingly, distributor 307 is placed in series with line 201 and line relay 2–LA. In addition, relay 3–SGA operated, completes an energizing path for distributor clutch magnet 306 of distributor 307 by way of the break contacts of contacts 3–FZL, break contacts 3–AX1 and make contacts 3–SGA, releasing distributor 307 for rotation.

With the wipers of stepping switch 406 on position 1 of each of arcs 1 through 5, distributor 307 is coded with the teletypewriter character A. For example, the first segment of distributor 307 extends by way of lead 301, the break contacts of contacts 3–FZL, FIG. 4, the wiper and position 1 of arc 1 of stepping switch 406 and lead 308 to lead 212 which, as previously described, is in series with line 201 and relay 2–LA. Similarly, the second segment of distributor 307 extends by way of lead 302, the break contacts of contacts 3–FZL, FIG. 4, the wiper and position 1 of arc 2 of stepping switch 406 and lead 308 to lead 212. Accordingly, during this rotation of distributor 307 the teletypewriter character A is transmitted to line 201 and to trunk circuit 206.

During the transmission of the start element of the character A, auxiliary contacts 309 of distributor 307 close, completing a path from ground by way of contacts 309, the break contacts of contacts 3–FZL and the winding of relay 3–AX1 to battery, operating relay 3–AX1. Relay 3–AX1 operated, opens the previously-described energizing path for clutch magnet 306 whereby distributor 307 stops at the end of the rotation. During the transmission of the stop element of the teletypewriter character A, auxiliary contacts 309 reclose, operating relay 3–AX2 in series with relay 3–AX1 by way of break contacts 4–SM1 and make contacts 3–AX1. With relays 3–AX1 and 3–AX2 operated, the previously-described operating and holding paths for relay 3–SGA are opened, releasing relay 3–SGA. Relay 3–SGA released, removes the blinding ground from select magnet 501 of sequential selector 502, disconnects distributor 307 from line 201 and reconnects line 201 to relay 2–LA as previously described.

The transmission of the character A to line 201 starts transmitter-distributor 209 at station 208 in the event that the transmitter is supplied with tape. Assuming, however, that transmitter-distributor 209 is not started, capacitor 402 is again charged by way of resistor 401 and tube 404 refires after one second, as previously described, whereby relay 4–SM1 operates and locks as previously described. Relay 4–SM1 operated, extinguishes tube 404, completes the previously-described energizing path for step magnet 407 and the previously-described operating path for relay 4–SM2. In addition, relay 4–SM1 operated, opens the previously-described operating path for relays 3–AX1 and 3–AX2 in series, whereby these latter relays release. Relay 4–SM2 operated, opens the previously-described operating path for relay 4–TA1, releasing this relay. The release of relay 4–TA1 extinguishes lamp 507 and opens the previously-described path extending line 201 to relay 2–LA. In addition, relay 4–TA1 released, recompletes the previously-described shunting path for trunk 206.

Returning now to the energization of step magnet 407, interrupter contacts 405 open to release relay 4–SM1 as previously described. Relay 4–SM1 released in turn opens the operating path for relay 4–SM2 and the energizing path for step magnet 407. The de-energization of step magnet 407 steps the wipers of stepping switch 406 to position 2. When relay 4–SM2 releases, a path is thus completed from ground by way of break contacts 4–SM2, the wiper and position 2 of arc 6 of stepping switch 406, the break contacts of contacts 3–TRA, break contacts 4–TB2, the winding of relay 4–TA2 and skip 2 key 409 to battery, operating relay 4–TA2.

Relay 4–TA2 operated, opens the previously-described shunting path across trunk 206 and completes an obvious energizing path for lamp 509 indicating the connection of trunk 206 to line 202. In addition, relay 4–TA2 operated, extends line 202 from battery by way of make contacts 4–TA2, the break contacts of contacts 5–BKA, the break contacts of contacts 3–SGA, the primary winding of relay 2–LA, the break contacts of contacts 5–BKA and make contacts 4–TA2 to ground on line 202. Accordingly line 202 is placed in series with relay 2–LA whereby the signals applied thereto are repeated to trunk 206 by the marking contacts of relay 2–LA.

Relay 4–TA2 operated also completes a path from battery by way of the winding of relay 3–SGA, the break contacts of relay 3–FZL, make contacts 4–TA2, the break contacts of contacts 3–TRA and break contacts 4–SM2, 4–SM1 and 3–AX1 to ground, operating relay 3–SGA which locks as previously described. Relay 3–SGA operated, places distributor 307 in series with relay 2–LA which in turn is in series with line 202 by way of the make contacts of relay 4–TA2. Accordingly, distributor 307 now transmits to line 202.

Returning now to relay 3–SGA operated, the previously-described blinding ground for select magnet 501 is reapplied and the previously-described energizing path for distributor clutch magnet 307 is recompleted. With the wipers of stepping switch 406 on position 2, it is apparent that distributor 307 is again coded with the teletypewriter character A which is transmitted to line 202 to start station A2 in the event that the station A2 transmitter-distributor is supplied with tape.

During the transmission of the start element of the character A, auxiliary contacts 309 close to operate relay 3–AX1, as previously described, and relay 3–AX1 operated, opens the previously-described energizing path for distributor clutch magnet 306. During the transmission of the stop element of the character A, auxiliary contacts 309 reopen whereby relay 3–AX2 operates in series with relay 3–AX1 and with relays 3–AX1 and 3–AX2 operated, relay 3–SGA releases as previously described. The release of relay 3–SGA removes the blinding ground from select magnet 501 and disconnects distributor 307 from line 202 and relay 2–LA as previously described. The circuit now awaits the response, if any, from station A2 on line 202.

*Trunk A Receives Message*

Assuming now that line 202 responds by sending a message tape, in the event that a message is preceded by letters characters, the letters signals are transmitted to trunk circuit 206 and repeated by relay 2–L1A to select magnet 501 as previously described. In response to each letters character, sequential selector 502 momentarily closes the make contacts of contacts 503 applying ground by way of the make contacts of contacts 503 and lead 511 to the upper plate of capacitor 402 thereby suppressing the timing of tube 404.

When the first character of the address code is repeated to select magnet 501, sequential selector 502 momentarily closes make contact 504 completing a path from ground by way of the break contacts of contacts 503, contacts 504, the break contacts of contacts 5–UNA and the winding of relay 5–UNA to battery, operating the relay which locks by way of the make contacts of contacts 5–UNA and normally closed contacts 505. Relay 5–UNA operated, completes an obvious energizing path for lamp 512 indicating that trunk circuit 206 is busy. In addition, relay 5–UNA operated, completes a locking path for relay 4–TA2 by way of make contacts 4–TA2 and make contacts 5–UNA. Relay 5–UNA operated also removes ground applied to the control electrode of tube 514 by way of resistor 513 and the break contacts of contacts 5–UNA. Tube 514 is thus unblinded and capacitor 515 charges by way of resistor 516 during the transmission of marking signals and discharges to ground by way of the spacing contact of relay 2–L1A during the transmission of spacing signals.

Returning now to relay 5–UNA operated, a path is completed from battery by way of the winding of relay 3–TRA, FIG. 3, make contacts 5–UNA and break contacts 3–HDA to ground, operating relay 3–TRA which locks by way of make contacts 3–TRA and break contacts 4–SM1.

*Trunk B Polls Outlying Stations*

During the interval following the transmission of the letters signals, tube 404 resumes timing and at the end of the timing period thereof relay 4–SM1 operates, operating relay 4–SM2 and energizing step magnet 407 as previously described. When step magnet 407 is energized, relay 4–SM1 releases, opening the operating path of relay 4–SM2 and de-energizing step magnet 407 whereby the wipers of stepping switch 406 step to the next position, as previously described, which in this case is position 3.

The subsequent release of relay 4–SM2 completes a path from ground by way of break contacts 4–SM2, the wiper and position 3 of arc 6 of stepping switch 406, the make contacts of contacts 3–TRA, break contacts 4–TA3, the winding of relay 4–TB3 and skip 3 key 411 to battery, operating relay 4–TB3. Relay 4–TB3 operated, completes an obvious energizing path for lamp 557 indicating that trunk 207 is extended to line 203. Relay 4–TB3 operated also removes the short across line 203 by way of break contacts 4–TA3 and 4–TB3. In addition, relay 4–TB3 operated, extends line 203 from battery by way of make contacts 4–TB3, the break contacts of contacts 5–BKB, the break contacts of contacts 3–SGB, the primary winding of relay 2–LB, the break contacts of contacts 5–BKB and make contacts 4-TB3 to ground on line 203. Accordingly, line 203 is extended through the primary winding of relay 2–LB whereby signals from line 203 are repeated to trunk 207 by way of the marking contacts of relay 2–LB. It is noted that trunk 207 is normally shorted by way of break contacts 5–BKB, 5–LUB and 4–TB1 through 4–TB5 to maintain the trunk in the marking condition. The operation of relay 4–TB3, however, removes the short thereby unblinding relay 2–L1B to signals repeated by relay 2–LB.

Relay 4–TB3 operated also completes a path from battery by way of the winding of relay 3–SGB, the break contacts of contacts 3–FZL, make contacts 4–TB3, break contacts 3–TRB, the make contacts of contacts 3–TRA and break contacts 4–SM2, 4–SM1 and 3–AX1 to ground, operating relay 3–SGB which locks by way of the break contacts of contacts 3–FZL, make contacts 3–SGB and break contacts 3–AX2. Relay 3–SGB operated, extends ground to select magnet 551 of sequential selector 552 by way of make contacts 3–SGB and break contacts 3–FZL. Accordingly, sequential selector 552, which is substantially identical to sequential selector 502, is blinded to signals applied to select magnet 551 by way of the make contacts of relay 2–L1B.

Relay 3–SGB operated, connects distributor 307 in series with line 203 and the primary winding of relay 2–LB by way of the make contacts of contacts 3–SGB, lead 213, the common lead and stop contacts of distributor 307, lead 212 and make contacts 3–SGB. In addition, relay 3–SGB operated, completes the energizing path for distributor clutch magnet 306 by way of the break contacts of contacts 3–FZL, break contacts 3–AX1 and make contacts 3–SGB. Distributor 307 now proceeds to send the start code to line 203 in the same manner as previously described. It is noted, however, with stepping switch 406 on position 3 that distributor 307 is coded with the character E since the first segment extends by lead 301, the break contacts of contacts 3–FZL, the wiper and position 3 of arc 1 of stepping switch 406 and lead 308 to lead 212. Accordingly, the circuit will proceed to connect each of the lines to trunk 207, polling each station for message material in substantially the same manner as previously described.

In the event that the circuit attempts to poll a station on line 202 by stepping to position 6, for example, before the termination of the transmission from station A2 to trunk 206, it is noted that the operating path of relay 4–TB2 is open at break contacts 4–TA2 precluding the operation of relay 4–TB2. In this event, line 202 is not connected to trunk 207 and tube 404 again times out to advance the wipers of stepping switch 406 whereby the stations on line 202 are skipped.

*Trunk B Receives Message*

Assuming now that station E3 responds to the polling character transmitted by distributor 307 by sending a message tape, the message signals are repeated to trunk 207 by relay 2–LB and relay 2–L1B in turn repeats the signals to select magnet 551. If the initial characters are letters signals, ground is applied by way of the make contacts of contacts 553 and lead 511 to the upper plate of capacitor 402 to preclude the timing of tube 404.

The first character of the address signal momentarily closes contacts 554, completing a path from ground by way of the break contacts of contacts 553, contacts 554, the break contacts of contacts 5–UNB and the winding of relay 5–UNB to battery, operating the relay which locks by way of the make contacts of contacts 5–UNB and normally closed contacts 555. Relay 5–UNB operated, completes a path from battery by way of the winding relay 3–TRB, make contacts 5–UNB and break contacts 3–HDB to ground, operating relay 3–TRB which locks by way of make contacts 3–TRB and break contacts 4–SM1. In addition, relay 5–UNB operated, completes a locking path for relay 4–TB3 by way of make contacts 4–TB3 and make contacts 5–UNB. Relay 5–UNB operated also completes an obvious energizing path for lamp 562 indicating the transmission of a message to trunk 207. In addition, relay 5–UNB operated, removes ground applied to capacitor 565 by way of the break contacts of contacts 5–UNB whereby capacitor 565 is charged by way of resistor 566 during the transmission of marking signals and discharged by way of the spacing contacts of relay 2–L1B during the transmission of marking signals. With relays 5–UNA and 5–UNB operated, ground is applied to the upper plate of capacitor 402 by way of the make contacts of these relays to preclude the timing of tube 404 whereby the operation of this circuit is stopped until the completion of the message from either of the transmitting stations.

*Termination of Message*

Returning now to the transmission of the message from station A2 to trunk 206, the end-of-address sequence is sent at the conclusion of the transmission of the address codes, setting sequential selector 502 in the "nonselect" condition. The end-of-message sequence figures V–Z is transmitted at the end of the message resetting sequential selector 502 into the "select" condition and momentarily opening contacts 505 whereby the locking path for relay 5–UNA is opened to release the relay. The release of relay 5–UNA opens the previously-described energizing path for lamp 512 extinguishing the lamp and reapplies ground to capacitor 515 precluding the operation of tube 514. In addition, relay 5–UNA operated, opens the previously-described locking path for relay 4–TA2 and this relay releases.

The release of relay 4–TA2 opens the previously-described energizing path for lamp 509 extinguishing the lamp. In addition, relay 4–TA2 released, reshunts line 202 by way of break contacts 4–TA2 and 4–TB2 and disconnects line 202 from the winding of relay 2–LA by way of the make contacts of relay 4–TA2.

Returning now to the release of relay 5–UNA, the previously-described discharge path for capacitor 402 is opened at make contacts 5–UNA whereby tube 404 starts to time out. When tube 404 fires, relay 4–SM1 operates as previously described. The operation of relay 4–SM1 opens the previously-described locking path for relay 3–TRA and this relay releases. With relay 3–TRA released and relay 4–SM1 operated, trunk circuit 206 resumes the polling of the outlying stations in the same manner as previously described.

The transmission of the end-of-address signal by station E3 to trunk 207 sets sequential selector 552 in the "nonselect" condition. When the end-of-message signal is transmitted by station E2, sequential selector 552 is reset in the "select" condition and contacts 555 momentarily open to release relay 5–UNB. The release of relay 5–UNB opens the previously-described energizing path for lamp 562, reapplies ground to capacitor 565 by way of the break contacts of contacts 5–UNB and opens the previously-described locking path for relay 4–TB3. The release of relay 4–TB3 opens the previously-described energizing path for lamp 557, reshunts line 203 by way of break contacts 4–TA3 and 4–TB3 and releases the connection of line 203 to the primary winding of relay 2–LB by way of the make contacts of relay 4–TB3.

In the event that trunk 206 has resumed polling, the release of relay 5–UNB together with the above-described operation of relay 4–SM1 releases relay 3–TRB. If the message being transmitted to trunk 206 has not concluded, the release of relay 5–UNB opens the previously-described discharge path for capacitor 402 whereby tube 404 refires to operate relay 4–SM1 as previously described. The operation of relay 4–SM1 opens the previously-described locking path for relay 3–TRB to release the relay. With relay 3–TRB released, trunk 207 resumes polling if a message is being transmitted into trunk 206.

*End-of-Message Coder*

Assuming now that the message from station A2 ends without the transmission of the end-of-message signal, the marking condition maintained on line 202 and repeated to trunk 206 maintains the armature of relay 2–L1A on the marking contact whereby blinding ground is removed from capacitor 515 by way of the space contacts of relay 2–L1A. Accordingly, capacitor 515 charges by way of resistor 516 and the increased potential is applied to the control electrode of tube 514 by way of resistor 513. After approximately one minute, tube 514 fires, drawing current by way of the winding of relay 5–LUA, the break contacts of contacts 5–LUA, the plate-to-cathode path of tube 514 and the break contacts of contacts 5–LUA to ground, operating relay 5–LUA which locks by way of the make contacts of contacts 5–LUA and the make contacts of contacts 5–UNA. The operation of relay 5–LUA opens the previously-described discharge path of tube 514 extinguishing the tube and discharges capacitor 515 to ground by way of the make contacts of contacts 5–LUA. In addition, relay 5–LUA operated, completes an obvious energizing path for lamp 517 indicating a lockup of trunk 206. Relay 5–LUA operated also completes an obvious energizing path for relay 5–AL and relay 5–AL operated, completes an energizing path for buzzer alarm 518 by way of make contacts 5–AL and break contacts 5–AR.

The attendant is thus advised that the station has ceased transmitting to trunk 206 without sending the end-of-message signal.

To release buzzer alarm 518, the attendant momentarily operates buzzer release key 519 completing an obvious energizing path for relay 5–AR which locks to ground by way of make contacts 5–AR and 5–AL. Relay 5–AR opens the previously-described energizing path for buzzer alarm 518.

In the event that the message from station E3 to trunk 207 ends without the end of transmission of the message signal, the operation of the armature of relay 2–L1B to the marking contacts opens the previously-described discharge path for capacitor 565 whereby tube 564 fires at the termination of a one-minute interval, drawing plate current by way of the winding of relay 5–LUB and the break contacts of contacts 5–LUB. Relay 5–LUB operated, locks by way of the make contacts of contacts 5–LUB and the make contacts of contacts 5–UNB. In addition, relay 5–LUB operated, completes an obvious energizing path for lockup lamp 567, discharges capacitor 565 by way of the make contacts of contacts 5–LUB and completes an obvious energizing path for relay 5–AL. Relay 5–AL completes the previously-described energizing path for buzzer alarm 518. The attendant is thus advised that the message being transmitted into trunk 207 terminated without the transmission of the end-of-message signal. The attendant may release buzzer alarm 518 by operating key 519 in the same manner as previously described.

To release the above-described lockup condition, the attendant momentarily operates clear key 311, FIG. 3. The momentary operation of key 311 completes a path from ground by way of key 311, make contacts 5–LUA or 5-LUB, the break contacts of contacts 3–FZL, break contacts 3–FZR and the winding of relay 3–FZL to battery, operating relay 3–FZL which locks by way of break contacts 3–FZR and the make contacts of contacts 3–FZL.

Assuming that trunk 206 is in the lockup condition, the operation of relay 3–FZL completes a path from battery by way of the winding of relay 3–SGA, the make contacts of contacts 3–FZL and the make contacts of contacts 5–LUA, operating relay 3–SGA. If the lockup condition is associated with trunk 207, the operation of relay 3–FZL completes a path from battery by way of the winding of relay 3–SGB, the make contacts of contacts 3–FZL, make contacts 5–LUB and the break contacts of contacts 5–LUA, operating relay 3–SGB. In addition, relay 3–FZL operated, opens the previously-described blinding ground for the appropriate one of sequential selectors 502 or 552. Relay 3–FZL operated also completes a discharge path for capacitor 402 by way of the make contacts of contacts 3–FZL precluding the operation of tube 404.

The operation of relay 3–SGA or 3–SGB places distributor 307 in series with relay 2–LA or 2–LB and the appropriate line connected thereto as previously described. In addition, relay 3–SGA or 3–SGB operated, completes the energizing path for distributor clutch magnet 306 by way of the make contacts of contacts 3–FZL, break contacts 3–C1 and make contacts 3–SGA or 3–SGB, releasing distributor 307 for rotation.

For the first rotation of distributor 307, the distributor segments are coded for the character figures. The first segment extends by way of lead 301 to lead 212 by way of the make contacts of contacts 3–FZL and break contacts 3–C2. The second segment is extended to lead 212 by way of lead 302, the make contacts of contacts 3–FZL and the break contacts of contacts 3–C4. The fourth segment is extended to lead 212 by way of lead 304, the make contacts of contacts 3–FZL and break contacts 3–C4. The fifth segment is extended to lead 212 by way of lead 305 and the make contacts of contacts 3–FZL.

During the transmission of the start element of the character figures, auxiliary contacts 309 momentarily close, applying ground by way of contacts 309, the make contacts of contacts 3–FZL, the break contacts of contacts 3–C2 and the winding of relay 3–C1 to battery. When auxiliary contacts 309 reopen at the conclusion of the transmission of the figures character, relay 3–C2 operates in series with relay 3–C1 by way of make contacts 3–C1, the winding of relay 3-C2 and break contacts 3–FZR. Relay 3–C2 operated, recompletes the energizing path for distributor clutch magnet 306 by way of break contacts 3–C3 and make contacts 3–C2 which shunt break contacts 3–C1 in the previously-described energizing path for clutch magnet 306 whereby distributor 307 is released for a second rotation.

For the second rotation of distributor 307, the distributor segments are coded for the character V. The second segment extends to lead 308 by way of lead 302, the make contacts of contacts 3–FZL and the break contacts of contacts 3–C4. The third segment extends to lead 308 by way of lead 302, the make contacts of contacts 3–FZL, make contacts 3–C2 and break contacts 3–C4. The fourth segment extends to lead 308 by way of lead 304, the make contacts of contacts 3–FZL and break contacts 3–C4. The fifth segment extends to lead 308 by way of lead 305 and the make contacts of contacts 3–FZL.

During the transmission of the start element of the character V, contacts 309 close to extend ground by way of the make contacts of contacts 3–FZL, the make contacts of contacts 3–C2 and the break contacts of contacts 3–C4 to the winding of relay 3–C3. At the conclusion of the transmission of the character V, auxiliary contacts 309 reopen and relay 3–C4 operates in series with relay 3–C3 by way of make contacts 3–C3, the winding of relay 3–C4 and break contacts 3–FZR. Relay 3–C4 operated, completes a path by way of break contacts 3–C5 and make contacts 3–C4, shunting break contacts 3–C1 in the previously-described energizing path for clutch magnet 306 whereby distributor 307 is released for a third revolution.

For the third rotation of distributor 307 the segments are coded with the character Z. The first segment extends to lead 308 by way of lead 301, the make contacts of contacts 3–FZL and the make contacts of contacts 3–C4. The fifth segment extends to lead 308 by way of lead 305 and the make contacts of contacts 3–FZL.

During the transmission of the start element of the character Z, auxiliary contacts 309 close, extending ground by way of the make contacts of contacts 3–FZL, the make contacts of contacts 3–C2, the make contacts of contacts 3–C4 and the break contacts of contacts 3–C6 to the winding of relay 3–C5. At the termination of the character Z, auxiliary contacts 309 reopen and relay 3–C6 operates in series with relay 3–C5 by way of make contacts 3–C5, the winding of relay 3–C6 and break contacts 3–FZR. Relay 3–C6 operated, completes a path by way of break contacts 3–C7 and make contacts 3–C6, shunting break contacts 3–C1 in the previously-described energizing path for distributor clutch magnet 306 whereby distributor 307 is released for a fourth rotation.

For the fourth rotation of distributor 307, the character letters are coded on the segments, lead 301 extends to lead 308 by way of the make contacts of relays 3–FZL and 3–C4. Lead 302 extends to lead 308 by way of the make contacts of contacts 3–FZL and make contacts 3–C6. Lead 303 extends to lead 308 by way of the make contacts of contacts 3–FZL, make contacts 3–C2 and make contacts 3–C6. Lead 304 extends to lead 308 by way of the make contacts of contacts 3–FZL and make contacts 3–C6. Lead 305 extends to lead 308 by way of the make contacts of contacts 3–FZL.

During the transmission of the start element of the letters character, auxiliary contacts 309 close, extending ground by way of the make contacts of contacts 3–FZL, 3–C2, 3–C4 and 3–C6 to the winding of relay 3–C7. At the termination of the transmission of the letters character, auxiliary contacts 309 reopen and relay 3–C8 operates in series with relay 3–C7 by way of make contacts 3–C7, the winding of relay 3–C8 and break contacts 3–FZR. Relay 3–C8 operated, completes an obvious operating path for relay 3–FZR which locks by way of make contacts 3–FZR, break contacts 4–SM2 and the make contacts of contacts 5–LUA or in the event that trunk 207 is locked up by way of the break contacts of contacts 5–LUA and make contacts 5–LUB.

Relay 3–FZR operated, opens the previously-described holding path for relays 3–C1 through 3–C8 and these relays release. In addition, relay 3–FZR operated, opens the previously-described operating and locking paths for relay 3–FZL. The release of relay 3–FZL opens the previously-described operating path for relay 3–SGA or relay 3–SGB and the appropriate relay releases. In addition, relay 3–FZL released, opens the previously-described discharge path for capacitor 402 by way of make contacts 3–FZL.

Assuming trunk 206 is in the lockup condition the transmission of the end-of-message signal figures V–Z letters resets sequential selector 502 in the "select" condition and momentarily opens contacts 505 to release relay 5–UNA as previously described. Relay 5–UNA released, opens the previously-described locking path for relay 5–LUA and this latter relay releases. Relay 5–UNA released also opens a possible discharge path for capacitor 402 by way of the make contacts of relays 5–UNB and 5–UNA. In addition, relay 5–UNA released, opens the previously-described energizing path for lamp 512 extinguishing the lamp and opens the previously-described locking path for relay 4–TA2, releasing this relay.

Relay 4–TA2 released, extinguishes lamp 509, reapplies the shorts across line 202 and trunk 206 and releases the connection between line 202 and relay 2–LA as previously described. Relay 5–LUA released, opens the previously-described operating path for relay 5–AL and the locking path for relay 3–FZR and these relays release. In addition, relay 5–LUA released, opens the previously-described energizing path for lamp 517. The release of relay 5–AL opens the locking path for relay 5–AR, releasing the relay. With relays 3–FZL and 5–UNA released, capacitor 402 again starts to charge and relay 4–SM1 operates when tube 404 fires as previously described. The operation of relay 4–SM1 opens the previously-described locking path for relay 3–TRA. With the release of relay 3–TRA, trunk 206 resumes the polling of the outlying stations.

In the event that trunk 207 is in the lockup condition, the transmission of the end-of-message signal by distributor 307 momentarily opens contacts 555 to release relay 5–UNB as previously described. The release of relay 5–UNB opens the previously-described locking paths for relays 5–LUB and 4–TB3 and these relays release. In addition, the release of relay 5–UNB extinguishes lamp 562.

The release of relay 4–TB3 extinguishes lamp 557, reshorts trunk 207 and line 203 and disconnects line 203 from relay 2–LB as previously described. The release of relay 5–LUB extinguishes lamp 567, opens the previously-described locking path for relay 3–FZR and the operating path for relay 5–AL and these relays release. The release of relay 5–AL releases relay 5–AR as previously described. With relays 3–FZL and 5–UNB released, tube 404 refires to operate relay 4–SM1 which in turn opens the previously-described locking path for relay 3–TRB placing trunk 207 in the same condition which results when the message is terminated by the end-of-message signal.

*Miscellaneous Alarms*

In the event that a line break occurs during the transmission of the message, the appropriate break lamp 521 or 571 is energized together with the lockup lamp 517 or 567. Assuming that during the transmission of the message from station A2 to trunk 206 the line opens, relay 2–LA repeats a spacing signal to relay 2–L1A. The maintenance of the armature of relay 2–L1A on the spacing contact is read by sequential selector 502 as successive blank characters momentarily closing contacts 506 whereby ground is extended to the winding of relay 5–BKA by way of the break contacts of contacts 5–BKA, operating relay 5–BKA which locks by way of the make contacts of contacts 5–BKA and contacts 505. Relay 5–BKA operated, completes an obvious energizing path for lamp 521 and an obvious operating path for relay 5–AL. Relay 5–AL operated, completes the energizing path for buzzer alarm 518 as previously described.

Returning now to relay 5–BKA operated, a path is completed from battery by way of resistor 214, the make contacts of contacts 5–BKA, the break contacts of contacts 3–SGA, the primary winding of relay 2–LA and the make contacts of contacts 5–BKA to ground, operating the armature of relay 2–LA to the marking contacts. This marking signal is repeated to relay 2–L1A, opening the previously-described discharge path for capacitor 515 by way of the space contacts of relay 2–L1A. Capacitor 515 now proceeds to charge by way of resistor 516 and, in parallel thereto, by way of resistor 522 and make contacts 5–BKA. After approximately one second, tube 514 fires to operate relay 5–LUA as previously described. The operation of relay 5–LUA completes the energizing path for lamp 517 and extinguishes tube 514. Buzzer alarm 518 may be de-energized by the operation of release key 519 as previously described.

To clear the line break condition, the attendant operates the appropriate skip key together with clear key 311. With station 202 locked up to trunk 206 as indicated by the energization of lamps 509, 521 and 517, the operation of skip 2 key 409 opens the previously-described operating and locking paths for relay 4–TA2, releasing the relay. The release of relay 4–TA2 opens the connection between line 202 and trunk 206 and extinguishes lamp 509 as previously described.

The attendant now operates clear key 311 whereby relay 3–FZL operates and relay 3–FZL together with relay 5–LUA completes the previously-described operating path for relay 3–SGA. The operation of relay 3–SGA connects distributor 307 in series with trunk 206 and distributor 307 sends the end-of-message signal to trunk 206 as previously described.

At the termination of the transmission of the end-of-message signal, relay 3–FZR operates followed by the release of relays 3–FZL and 3–SGA. The reception of the end-of-message signal by sequential selector 502 restores it to the "select" condition and momentarily opens contacts 505 to release relay 5–UNA as previously described. In addition, the momentary opening of contacts 505 opens the previously-described locking path for relay 5–BKA and relay 5–BKA in turn extinguishes lamp 521.

The release of relay 5–UNA releases relay 5–LUA and extinguishes lamp 512 as previously described. Relay 5–LUA in turn releases relays 3–FZR and 5–AL and relay 5–AL released opens the locking path of relay 5–AR as previously described.

The connection between line 202 and trunk 206 is now released and line 202 is on "skip" since key 409 is operated. With relay 3–FZL released, tube 404 again fires to operate relay 4–SM1 which in turn releases relay 3–TRA. When relay 3–TRA releases, trunk 206 resumes searching for traffic as previously described. It is noted, however, that the stations on line 202 are skipped since the operating path of relay 4–TA2 is open at the contacts of skip 2 key 409.

Similarly, an open line during the transmission of a message from station E3 to trunk 207 operates the armature of relay 2–L1B to its spacing contacts. This is read by sequential selector 552 as successive blank characters completing the energizing path for relay 5–BKB. Relay 5–BKB in turn completes the energizing path for lamp 571 and an obvious operating path for relay 5–AL and relay 5–AL in turn energizes buzzer alarm 518. Relay 5–BKB also completes a path from battery by way of resistor 215, to make contacts of contacts 5–BKB, the break contacts of contacts 3–SGB, the primary winding of relay 2–LB and the make contacts of contacts 5–BKB to ground, operating the armature of relay 2–LB to its marking condition. The armature of relay 2–L1B is operated to its marking contacts whereby capacitor 565 is charged by way of resistors 566 and 572 in parallel. Tube 564 fires after approximately one second and relay 5–LUB operates to energize lamp 567 and extinguish tube 564. Buzzer alarm 518 may be de-energized by the operation of key 519 as previously described.

The line break condition may be cleared by the operation of skip 3 key 411 and clear key 311. Key 411 operated, opens the previously-described operating and locking paths for relay 4–TB3 and relay 4–TB3 in turn de-energizes lamp 557 and opens the previously-described connection between line 203 and relay 2–LB. The momentary operation of key 311 operates relay 3–FZL which in turn operates relay 3–SGB as previously described. Relay 3–SGB operated, connects distributor 307 in series with the primary winding of relay 2–LB and distributor 307 sends the end-of-message signal to trunk 207 as previously described.

At the termination of the transmission of the end-of-message signal, relay 3–FZR operates, releasing relay 3–FZL and relay 3–SGB as previously described. In addition, the reception of the end-of-message signal by sequential selector 552 restores it to the "select" condition and momentarily opens contacts 555 to release relays 5–UNB and 5–BKB.

Relay 5–BKB released, extinguishes lamp 571. Relay 5–UNB released, releases relay 5–LUB which extinguishes lamp 567 as previously described. The release of relay 5–LUB releases relays 3–FZR and 5–AL and relay 5–AL in turn releases relay 5–AR as previously described.

When tube 404 subsequently fires to operate relay 4–SM1, relay 3–TRB releases as previously described. The connection between line 203 and trunk 207 is now released, line 203 is on "skip" and the circuit is restored to the initial condition.

In the event that the trunk circuit opens during transmission thereto, the appropriate break lamp 521 or 571 is energized. The opening of trunk 206, for example, operates the armature of relay 2–L1A to its spacing contacts whereby contacts 506 momentarily close to operate relay 5–BKA as previously described. Relay 5–BKA operated, energizes lamp 521 and operates relay 5–AL which in turn energizes buzzer 518 as previously described.

Returning now to relay 5–BKA operated, the connection between line 202 and trunk 206 is opened and relay 2–LA is operated to its marking contact as previously described. Relay 2–L1A, however, does not respond to the marking signal since trunk 206 is open. The attendant may de-energize buzzer 518 at this time as previously described.

With lamps 521 and 509 energized, indicating an open trunk condition, the attendant releases line 202 by operating and releasing skip key 409. The operation of skip key 409 releases relay 4–TA2 as previously described and relay 4–TA2 released, de-energizes lamp 509 and releases the connection of line 202 to trunk 206. The subsequent release of skip key 409 renders linne 202 available to polling by trunk 207. Trunk 206, however, is held since relays 5–UNA and 3–TRA are operated.

In the event trunk 206 opens or goes spacing when a message is not being transmitted thereto, the armature of relay 2–L1A is operated to its spacing contact whereby sequential selector 502 reads a double blank. Contacts 506 are thereby momentarily closed to operate relay 5–BKA as previously described. In addition, the recognition of the spacing signal as the character blank momentarily closes contacts 504 whereby relay 5–UNA operates as previously described.

Relay 5–UNA operated, energizes lamp 512 and operates relay 3–TRA as previously described. Relay 5–BKA operated, connects line battery to relay 2–LA, energizes lamp 521 and operates relay 5–AL which in turn energizes buzzer 518 as previously described. Buzzer 518 may be de-energized by the operation of release key 519 as previously described. At this time, with relays 5–UNA and 3–TRA operated, trunk 206 is locked out of the circuit and the search for message material is transferred to trunk 207.

When the trunk closes after the open condition, the armature of relay 2–L1A is operated to the marking contacts, opening the previously-described discharge path for capacitor 515. With relay 5–BKA operated, tube 514 fires after approximately one second to operate relay 5–LUA which in turn energizes lockup lamp 517.

The attendant may clear the trunk after it closes by operating clear key 311. The momentary closure of key 311 operates relay 3–FZL which in turn operates relay 3–SGA as previously described. Relay 3–SGA operated, connects distributor 307 in series with the primary winding of relay 2–LA and distributor 307 sends the end-of-message signal to trunk 206 in the same manner as previously described. At the termination of the transmission of the end-of-message signal, relay 3–FZR operates, releasing relay 3–FZL which in turn releases relay 3–SGA as previously described. In addition, sequential selector 502 responds to the end-of-message signal by momentarily opening contacts 505 to release relays 5–UNA and 5–BKA. Relay 5–BKA released, de-energizes lamp 521; relay 5–UNA released, de-energizes lamp 512 and releases relay 5–LUA as previously described. The release of relay 5–LUA de-energizes lamp 517 and releases relays 3–FZR and 5–AL and relay 5–AL in turn releases relay 5–AR as previously described.

The release of relay 3–FZL opens the discharge path of capacitor 402 and tube 404 fires, operating relay 4–SM1 which in turn releases relay 3–TRA as previously described. With relay 3–TRA released, trunk 206 resumes polling for message material.

It may be desirable to set up various line-to-trunk connections sending the end-of-message signal to put sequential selectors in the "select" condition. In order to connect trunk 206 to the various lines, the attendant first operates hold key 312 completing a path by way of the break contacts of contacts 3–TRA and 3–HDA and the winding of relay 3–HDA to battery, operating relay 3–HDA which locks by way of the make contacts of contacts 3–HDA and break contacts 3–FZR. Relay 3–HDA operated, completes a discharge path for capacitor 402 by way of make contacts 3–HDA precluding the operation of tube 404.

To connect the appropriate line to trunk 206, the attendant repeatedly operates selector key 412 until the wipers of stepping switch 406 are on the appropriate position to operate the desired 4–TA relay which relay in turn energizes the appropriate lamp such as lamp 507, for example, and connects line 202 to trunk 206.

The end-of-message signal is sent to the trunk and the desired line by momentarily operating clear key 311 which in turn operates relay 3–FZL as previously described. Relay 3–FZL operated, completes a path from battery by way of the winding of relay 3–SGA, the make contacts of contacts 3–FZL, the break contacts of contacts 3–TRA and make contacts 3–HDA to ground, operating relay 3–SGA. With relay 3–SGA operated, distributor 307 is connected in series with relay 2–LA and the appropriate line circuit. Distributor 307 now proceeds to send the end-of-message signal in the same manner as previously described.

During the transmission of the first character in the message signal, contacts 504 of sequential selector 502 momentarily close whereby relay 5–UNA operates as previously described. Relay 5–UNA in turn locks the operated one of the 4–TA relays and energizes lamp 512.

Near the termination of the transmission of the end-of-message signal, relay 3–FZR operates, releasing relay 3–FZL and relays 3–C1 through 3–C8 as previously described. In addition, the release of relay 3–FZR opens the previously-described locking path for relay 3–HDA and this relay releases. The release of relay 3–C8 opens the previously-described operating path for relay 3–FZR, releasing the relay.

Relay 3–FZL released, opens the previously-described operating path for relay 3–SGA and this relay releases. Relay 3–HDA released, completes the previously-described energizing path for relay 3–TRA, operating the relay.

The transmission of the end-of-message signal momentarily opens contacts 505 releasing relay 5–UNA which in turn de-energizes lamp 512 and releases the operated one of the 4–TA relays. The release of the 4–TA relay opens the line-to-trunk connection and de-energizes the line lamp such as lamp 507, for example.

Returning now to the release of relays 3–HDA and 3–FZL, the previously-described discharge paths for capacitor 402 by way of the make contacts of relays 3–FZL and 3–HDA are open whereby tube 404 refires, operating relay 4–SM1. Relay 4–SM1 operated, releases relay 3–TRA, as previously described, whereby the circuit is restored to the initial condition and trunk 206 may resume searching for message material.

In the event it is desired to hold trunk 206 out of the circuit, the busy key comprising normally open contacts 313 and 413 is operated. The closure of contacts 313 completes an obvious energizing path for relay 3–TRA whereby the previously-described operating paths for the 4–TA relays are opened. The closure of contacts 413 applies shunting ground around make contacts 5–UNA in the previously-described discharge path for capacitor 402. Accordingly, the 4–TA relays cannot operate, whereby trunk 206 is unable to poll the line stations. In addition, in the event that trunk 207 starts a station transmitter, relay 5–UNB operates to complete a discharge path for capacitor 402 by way of make contacts 5–UNB and contacts 413, terminating the operation of tube 404.

In the event it is desired to hold trunk 207 out of the circuit, the busy key comprising make contacts 314 and 414 is operated. Accordingly, when trunk 206 starts a station transmitter, the discharge path for capacitor 402 is completed by way of normally open contacts 414 and make contacts 5–UNA whereby the circuit operation is terminated until trunk 206 can resume polling for message material.

If it is desired to send the end-of-message signal to trunk 207, busy key comprising contacts 313 is operated to operate relay 3–TRA and hold trunk 206. Hold key 312 is then operated, completing a path from ground by way of normally open contacts 312, the make contacts of contacts 3–TRA, the break contacts of contacts 3–HDB and the winding of relay 3–HDB which locks by way of the make contacts of contacts 3–HDB and break contacts 3–FZR. Relay 3–HDB operated, completes an obvious discharge path for capacitor 402, terminating the polling cycle. Clear key 311 is subsequently operated whereby relay 3–FZL operates. The operation of relay 3–FZL completes a path from battery by way of the winding of relay 3–SGB, the make contacts of contacts 3–FZL, break contacts 3–TRB, the make contacts of contacts 3–TRA and make contacts 3–HDB. The operation of relay 3–SGB connects distributor 307 in series with relay 2–LB and the end-of-message signal is sent to sequential selector 552 in the same manner as previously described. The first character of the end-of-message signal momentarily closes contacts 554, operating relay 5–UNB.

Near the termination of the transmission of the end-of-message signal, relay 3–FZR operates, releasing relays 3–FZL, 3–HDB and 3–C1 through 3–C8 as previously described. Relay 3–C8 in turn releases relay 3–FZR and relay 3–FZL releases relay 3–SGB. Relay 3–HDB released, completes the previously-described operating path for relay 3–TRB.

The reception of the end-of-message signal by sequential selector 552 releases relay 5–UNB and relay 5–UNB in turn releases the operated one of the 4–TB relays whereby the connection of trunk 207 to the connected line circuit is released. With relays 3–FZL and 3–HDB released, the previously-described discharge path for capacitor 402 is open and tube 404 refires, operating relay 4–SM1. Relay 4–SM1 operated, releases relay 3–TRB as previously described. The circuit is now in the initial condition and can resume searching for message traffic.

Although a specific embodiment of the invention has been shown and described, it will be understood that various modifications may be made without departing from the spirit of this invention and within the scope of the appended claims.

What is claimed is:

1. In a telegraph switching system, a central station, a plurality of transmission lines extending from said central station, each of said transmission lines extending to at least one outlying station, each of said outlying stations including a telegraph transmitter selectively started by the impression of a transmitter-start code signal on said line, a plurality of outgoing trunks extending from said central station, means for generating said start code signals, sequentially operating means for coding said start signals of each of said outlying stations on said generating means, one at a time and in rotation, means associated with each of said trunks and responsive to said sequentially operating means for registering a designation of said line extending to said outlying station, means responsive to said registering means for selectively connecting said associated trunk to said designated line, means responsive to said connecting means for impressing said start signals on said designated line, means responsive to the starting of said outlying station transmitter on said designated line for maintaining said registration, means responsive to said maintained registration of said associated registering means for disabling said associated registering means, further means responsive to said maintained registration of said associated registering means for precluding the subsequent designation of said designated line by other ones of said registering means, means responsive to maintained registrations of all of said registering means for disabling said sequentially operating means, and means responsive to the termination of the operation of said outlying station transmitter for removing said maintained registration of said associated registering means.

2. In a telegraph switching system, a central station, a plurality of transmission lines extending from said central station, each of said transmission lines extending to at least one outlying station, each of said outlying stations including a telegraph transmitter selectively started by the impression of a transmitter-start code signal on said line, a plurality of outgoing trunks extending from said central station, means for generating said start code signals, sequentially operating means for coding said start signals of each of said outlying stations on said generating means, one at a time and in rotation, means associated with each of said trunks and responsive to said sequentially operating means for registering a designation of said line extending to said outlying station, means responsive to said registering means for selectively connecting said associated trunk to said designated line, means responsive to said connecting means for impressing said start signals on said designated line, means responsive to the starting of said outlying station transmitter on said designated line for maintaining said registration, and further means responsive to said maintained registration of said associated registering means for precluding the subsequent designation of said designated line by other ones of said registering means.

3. In a telegraph switching system, a central station, a plurality of transmission lines extending from said central station, each of said transmisison lines extending to at least one outlying station, each of said outlying stations including a telegraph transmitter selectively started by the impression of a transmitter-start code signal on said line, a plurality of outgoing trunks extending from said central station, means for generating said start code signals, sequentially operating means for coding said start signals of each of said outlying stations on said generating means, one at a time and in rotation, means associated with each of said trunks and responsive to said sequentially operating means for registering a designation of said line extending to said outlying station, means responsive to said registering means for selectively connecting said associated trunk to said designated line, means responsive to said connecting means for impressing said start signals on said designated line, means responsive to the starting of said outlying station transmitter on said desigated line for maintaining said registration, and means responsive to said maintained registration of said associated registering means for disabling said associated registering means.

4. In a telegraph switching system, a central station, a plurality of transmission lines extending from said central station, each of said transmission lines extending to at least one outlying station, each of said outlying stations including a telegraph transmitter selectively started by the impression of a transmitter-start code signal on said line, a plurality of outgoing trunks extending from said central station, means for generating said start code signals, sequentially operating means for coding said start signals of each of said outlying stations on said generating means, one at a time and in rotation, means associated with each of said trunks and responsive to said sequentially operating means for registering a designation of said line extending to said outlying station, means responsive to said registering means for selectively connecting said associated trunk to said designated line, and means responsive to said connecting means for impressing said start signals on said designated line.

5. In a telegraph switching system, a central station, a plurality of transmission lines extending from said central station, each of said transmission lines extending to at least one outlying station, each of said outlying stations including means selectively responsive to control signals, a plurality of outgoing trunks extending from said central station, means for generating said control signals, sequentially operating means for coding said control signals of each of said outlying stations on said generating means, one at a time and in rotation, means associated with each of said trunk and responsive to said sequentially operating means for registering a designation of said line extending to said outlying station, means responsive to said registering means for selectively connecting said associated trunk to said designated line, means responsive to said connecting means for impressing said control signals on said designated line, and further means responsive to said registration of said associated registering means for precluding the subsequent designation of said designated line by other ones of said registering means.

6. In a telegraph switching system, a central station, a plurality of transmission lines extending from said central station, each of said transmission lines extending to at least one outlying station, each of said outlying stations including means selectively responsive to control signals, an outgoing trunk extending from said central station, means for generating said control signals, sequentially operating means for coding said control signals of each of said outlying stations on said generating means, one at a time and in rotation, means responsive to said sequentially operating means for registering a designation of said line extending to said outlying station, means responsive to said registering means for selectively connecting said trunk to said designated line, and means responsive to said connecting means for impressing said start signals on said designated line.

7. In a telegraph switching system, a central station, a plurality of transmission lines extending from said central station, each of said transmission lines extending to at least one outlying station, each of said outlying stations including a telegraph transmitter selectively started by the impression of a transmitter-start code signal on said line, an outgoing trunk extending from said central station, means for generating said start signals, sequentially operating means for coding said start signals of each of said outlying stations on said generating means, one at a time and in rotation, means responsive to said sequentially operating means for registering a designation of said line extending to said outlying station, means responsive to said registering means for selectively connecting said trunk to said designated line, means responsive to said connecting means for impressing said start signals on said designated line, means responsive to the reception of signals from said designated line for maintaining said registration, and means responsive to said maintained registration for disabling said sequentially operating means.

8. In a telegraph switching system, a central station, a plurality of transmission lines extending from said central station, each of said transmission lines extending to at least one outlying station, each of said outlying stations including a telegraph message transmitter selectively started by the impression of a transmitter-start code signal on said line, an outgoing trunk extending from said central station, means for generating said start signals, sequentially operating means for coding said start signals of each of said outlying stations on said generating means, one at a time and in rotation, means responsive to said sequentially operating means for registering a designation of said line extending to said outlying station, means responsive to said registering means for selectively connecting said trunk to said designated line, means responsive to said connecting means for impressing said start signals on said designated line, means responsive to the reception of a message from said designated line for maintaining said registration, means responsive to said maintained registration for disabling said sequentially operating means, and means responsive to the termination of said message for removing said maintained registration.

9. In a telegraph switching system, a central station, a plurality of transmission lines extending from said central station, a plurality of outgoing trunk lines extending from said central station, means common to said transmission lines for generating control signals, means associated with each of said trunks and responsive to the idle condition of said associated trunk for extending said associated trunk to a selected one of said lines, further means associated with each of said trunks and responsive to said extending means for seizing said generating means, and means responsive to said seizing means for impressing said control signals on said selected line.

10. In a telegraph switching system, a central station, a plurality of transmission lines extending from said central station, each of said transmission lines extending to at least one outlying station, each of said outlying stations including a telegraph transmitter selectively started by the impression of a transmitter-start code signal on said line, a plurality of outgoing trunk lines extending from said central station, means common to said transmission lines for generating said transmitter-start code signals, means associated with each of said trunks and responsive to the idle condition of said associated trunk for extending said associated trunk to a selected one of said lines, further means associated with each of said trunks and responsive to said extending means for seizing said generating means, and means responsive to said seizing means for impressing said transmitter-start code signals on said selected line.

11. In a telegraph switching system, a central station, a plurality of transmission lines extending from said central station, each of said transmission lines extending to at elast one outlying station, each of said outlying stations including a telegraph transmitter selectively started by the impression of a transmitter-start code signal on said line, a plurality of outgoing trunk lines extending from said central station, means common to said transmission lines for generating said transmitter-start code signals, means associated with each of said trunks and responsive to the idle condition of said associated trunk for extending said associated trunk to a selected one of said lines, further means associated with each of said trunks and responsive to said extending means for seizing said generating means, means responsive to said seizing means for impressing said transmitter-start code signals on said selected line, and means responsive to the starting of an outlying station transmitter on said selected line for releasing said generating means and precluding the extension of other ones of said trunks to said selected line.

References Cited in the file of this patent

UNITED STATES PATENTS

| | | |
|---|---|---|
| 2,088,750 | Kinkead | Aug. 3, 1937 |
| 2,474,257 | Klienschmidt | June 28, 1949 |
| 2,979,556 | Anspach et al. | Apr. 11, 1961 |
| 3,022,372 | Votaw | Feb. 20, 1962 |